United States Patent
Berrada et al.

[11] Patent Number: 6,151,329
[45] Date of Patent: Nov. 21, 2000

[54] TRANSMISSION CONTROL METHOD BETWEEN A PLURALITY OF STATIONS

[75] Inventors: Marouane Berrada, Saint-Maur-des-Fosses; Américo Brajal, Villeneuve-le-Roi; Héba Koraïtim, Paris, all of France

[73] Assignee: U.S. Philips Corporation, New York, N.Y.

[21] Appl. No.: 08/914,055

[22] Filed: Jul. 15, 1997

[30] Foreign Application Priority Data

Jul. 17, 1996 [EP] European Pat. Off. ............ 96401592

[51] Int. Cl.[7] .................... H04L 12/413; H04B 7/212
[52] U.S. Cl. ............................... 370/447; 370/348
[58] Field of Search .................. 370/442, 443, 370/444, 445, 446, 447, 431, 461, 462, 347, 348, 321, 322, 337, 449

[56] References Cited

U.S. PATENT DOCUMENTS

| | | | |
|---|---|---|---|
| 4,641,304 | 2/1987 | Raychaudhuri | 370/95 |
| 5,185,737 | 2/1993 | Nassehi et al. | 370/85.8 |
| 5,278,833 | 1/1994 | Crisler et al. . | |
| 5,303,234 | 4/1994 | Kou | 370/85.2 |
| 5,390,181 | 2/1995 | Campbell et al. | 370/85.2 |
| 5,404,353 | 4/1995 | Michael et al. | 370/79 |
| 5,590,131 | 12/1996 | Kabatepe | 370/461 |
| 5,896,385 | 4/1999 | Achilleoudis | 370/443 |
| 5,917,813 | 6/1999 | Van Driel et al. | 370/348 |

OTHER PUBLICATIONS

Announced Retransmission Random Access Protocoles, Dipankar Raychaudhuri, IEEE Transactions on Communications, vol. COM–33, No. 11, Nov. 1985.

*Primary Examiner*—Ajit Patel
*Assistant Examiner*—Brian Nguyen
*Attorney, Agent, or Firm*—Gregory L. Thorne

[57] ABSTRACT

A communication protocol for use by stations in multiple access telecommunication network wherein communication between stations is via a master station. An upstream channel to the master station is shared by the other stations and has successive frames each consisting of K message slots, each message slot including a data part (DM) for the transmission of a message and M minislots for transmission of slot reservation signals. According to the invention, in case of unsuccessful message transmission and collision between transmission requests, reservation signals for retransmission of a message can be transmitted in any of the K×M minislots of each entire frame. The large number of minislots thereby made available reduces the danger of collision between retransmission requests.

3 Claims, 2 Drawing Sheets

TRANSMISSION CONTROL METHOD BETWEEN A PLURALITY OF STATIONS

BACKGROUND OF THE INVENTION

1. Field of the Invention

The present invention relates to a method of controlling the transmission of messages between a plurality of stations, said stations being interconnected via a communication channel comprising at least an upstream channel at least partially shared by said stations. The upstream channel is divided into successive frames of predetermined length, each frame consisting of message slots, each of which includes a data part for the transmission of at least a message generated by one of the stations, and M minislots, for sending, in case of unsuccessful transmission of messages, transmission requests in the form of available data slot reservation signals. This method may for instance constitute an appropriate multiple access communication protocol for allowing low level interactivity in satellite networks.

2. Description of the Related Art

In addition to traditional television programmes, it is often proposed to offer to TV users various interactive services and especially the opportunity to exchange information with service providers. Interactivity will be available thanks to a low bitrate return link from user premises to service provider facilities via a geostationary satellite transponder. It is however a challenge to develop a technique that offers a simple and robust channel access to a large number of user terminals with varying traffic volumes, burstiness and time constraints.

A contention-based protocol well adapted to such applications is described for instance in U.S. Pat. No. 4,641,304. As illustrated in FIG. 1 showing an earth station 1 and several frames I, . . . , I+R, I+R+1, of a communication channel 2 shared by a plurality of ground stations (not shown), the earth station or hub 1, which may be one of these stations, constitutes a master station that is able to broadcast via a downstream link a feedback that monitors the upstream link of the channel. In the illustrated case, the round trip delay corresponding to a double hop between the stations and the hub (via a geostationary satellite) is equal to 0,54 second.

As shown in FIG. 2, said protocol, called ARRA for Announced Retransmission Random Access, is based on an organization of the upstream link (or channel) in frames of t(f) seconds in length, composed of K message slots 21(1) to 21(K) and a particular slot called common minislot pool or CMP. Each message slot (or data slot) has a time duration of t(m) and is composed of a data part (or data message DM) and K minislots, and the CMP is also composed of K minislots but without any data part. The time durations of the minislots of the CMP and of each message slot are very small compared to t(m), and the minislots of each message slot occur at the beginning of the message slot.

When a message has to be transmitted from a first station to a second one, this message has to wait until the beginning of the next frame, here called frame I, occurs. Before frame I, all the stations will have received from the hub a feedback message or signal indicating which slot is free for new messages and which is already reserved for messages which had already successfully sent a transmission request. If there are indeed some free message slots, the transmitting station chooses randomly one of these available slots, transmits its message in the data part of this slot, and puts an associated transmission request in one of the minislots (randomly chosen) of the concerned message slot, in order to announce where it will retransmit in case of collision. If there are no available slot, this station puts a transmission request in one of the minislots of the CMP.

After the propagation delay (0,27 second in the above-indicated example), the hub receives all the messages and transmission requests that have been sent in the frame I. It then detects collisions in the data slots and calculates the set of slots that are not reserved (or available slot set ASS) in the frame I+R+1, i.e. in the frame that begins after all the stations have received from the hub the feedback messages (all the stations that have transmitted in frame I being assumed to receive their feedback before frame I+R+1). A slot in said frame I+R+1 is said to be reserved if and only if one request has announced a retransmission in this slot, and on the contrary is available if no request has announced such a retransmission. If more than one request announces a retransmission in the same slot, no successful transmission is possible and this slot is let free for new arrivals, while retransmission requests now occur in the CMP.

After having calculated the available slot set (ASS), i.e. the set of slots available for new messages, the hub broadcasts to all the stations both said ASS and the status of each message slot in the frame (empty, or available=E; used with success=S; collision=C):

(1) if a station has sent a message in a data slot and receives a feedback signal S (successful transmission), it exits the protocol;

(2) if a station receives a feedback signal C (collision) or has sent a request in the CMP, it reads the ASS broadcasted by the hub:

(a) if the reference number of the minislot does not correspond to any of the slots of the ASS, it means that this number corresponds to a reserved slot and that the request for retransmission has been successful: the station sends its message in this reserved data slot, and will then exit the protocol;

(b) if the reference number of the minislot corresponds to a slot of the ASS, it means that the request has failed, and this slot is available for new messages, while the concerned station has to use the CMP for retransmitting its request.

Some computations related to the implementation of this ARRA protocol show that the throughput cannot overpass 0,4 (i.e. 40% of the data slots are not used for transmission). At high loads, more and more requests are indeed sent in the CMP and it becomes impossible to transmit a successful request because of the high probability of collision, in the CMP, between a high number of retransmitted requests trying to use a relatively small amount of minislots.

SUMMARY OF THE INVENTION

It is therefore an object of the invention to propose an improved protocol reducing the probability of collisions in the minislots and increasing the performance behaviour of the protocol in terms of average throughput.

To this end the invention relates to a method as defined in the preamble of the description and wherein reservation signals corresponding to retransmission requests take place in anyone of the K×M minislots of the minislot areas of the frame.

The basic idea of said method is to consider all the minislot areas as a large CMP, which allows to reduce the probability of collisions in the minislots. Moreover, by enabling retransmitted requests only in minislots of reserved slots, one avoids that transmission requests of newly arrived messages collide with such retransmitted requests. This solution increases the maximal stable throughput limit to about 0,92 without any noticeably increased complexity.

BRIEF DESCRIPTION OF THE DRAWINGS

The present invention will be now described in further detail with reference to the accompanying drawings, in which.

DESCRIPTION OF THE PREFERRED EMBODIMENT

Figure 1:
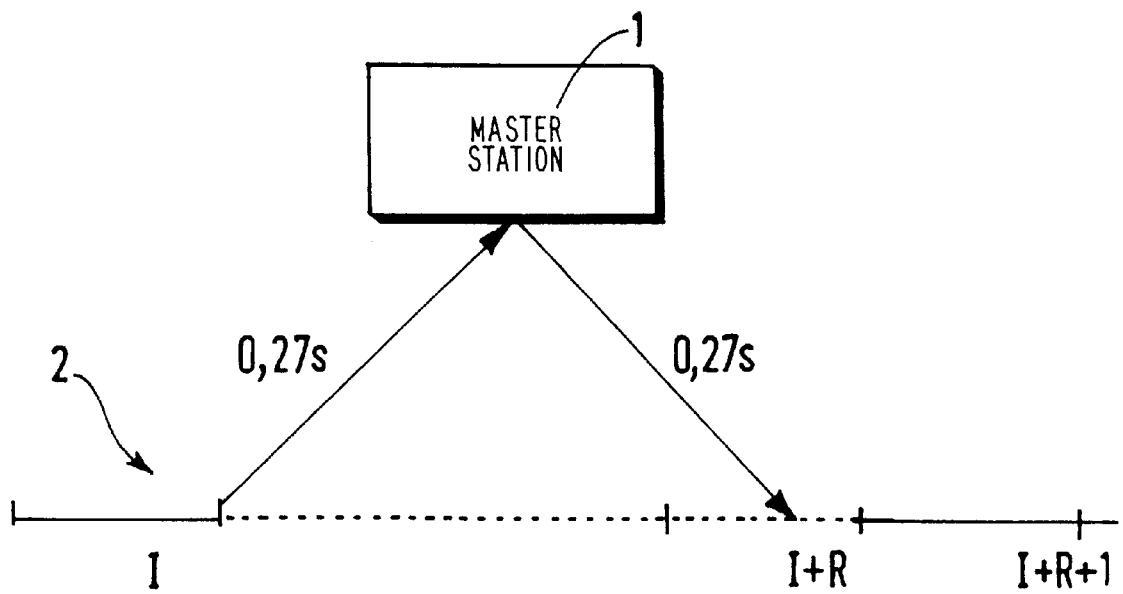
FIG. 1 shows schematically a communication channel divided into successive frames and a master station provided for monitoring the transmission of messages between stations via said communication channel.
Figure 2:
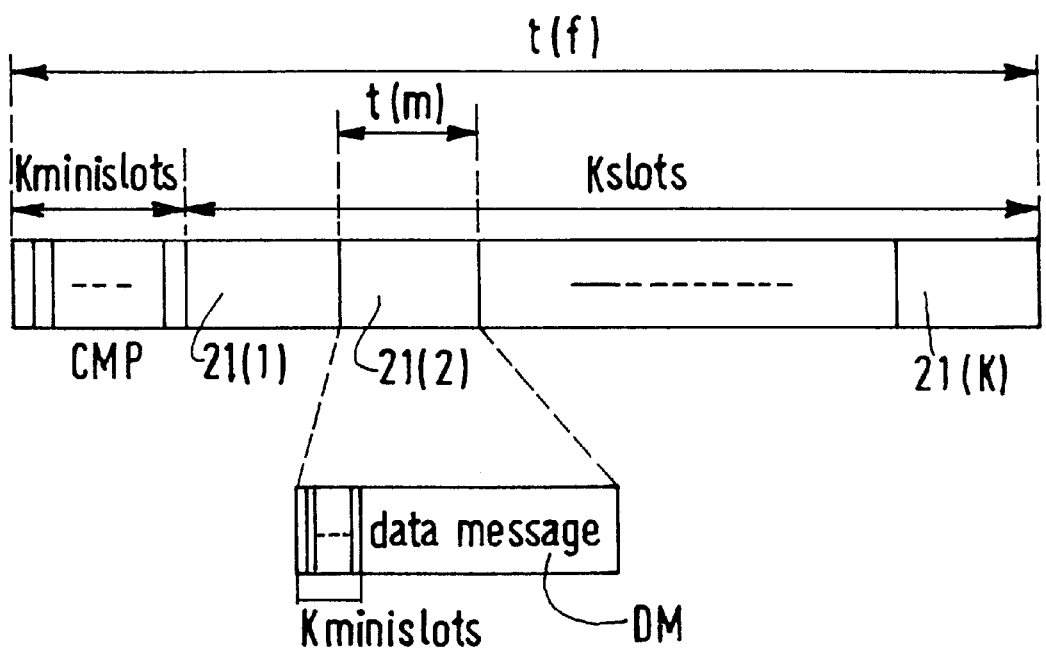
FIGS. 2 and 3 illustrate the structure of each frame when using respectively the known protocol ARRA and the protocol according to the invention.
Figure 3:
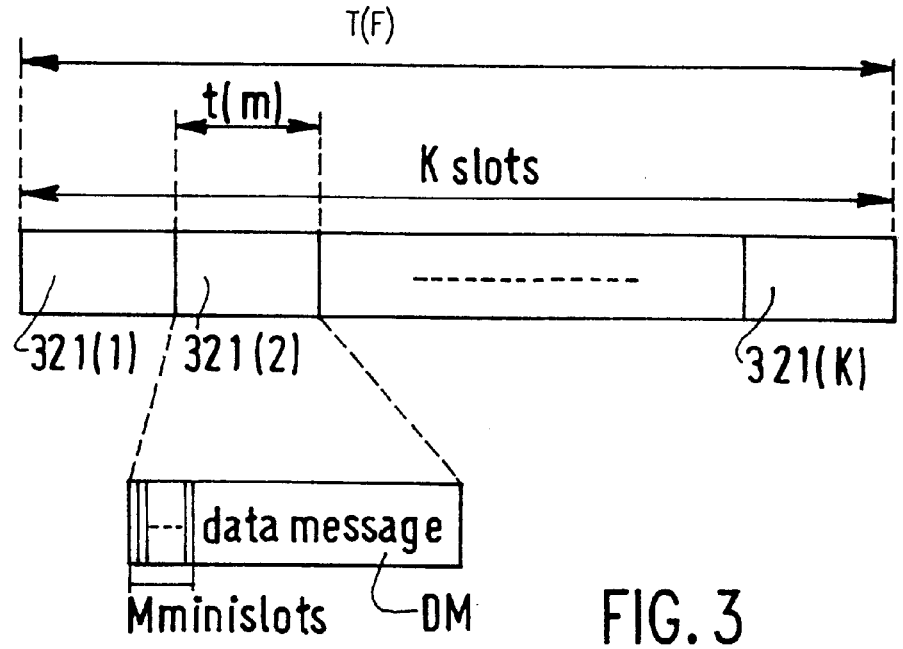

In fact it has been seen that the limitation of the ARRA protocol is caused by the high number of requests colliding in the CMP, said requests having very little chance to be accepted by the hub since they frequently collide in a small number of minislots. According to the invention, it has been found that the probability of collision is reduced if all the minislot areas of the frame are considered as a larger CMP. The upstream link now comprises frames including K message slots and each of these slots contains, as indicated in FIG. 3, a data slot and M minislots, the total number of minislots being K×M. The feedback is transmitted (downlink) in a frame of K slots, each of them comprising two pieces of information:

(a) a first one (2 bits) for the status E (empty), S (successful) or C (collision) of the corresponding data slot in the upstream frame;

(b) a second one (at most 6 bits in this case) for the identification of the winning minislot, i.e. of the minislot really used by the station that is allowed to transmit a message in the data part of the corresponding slot in the next upstream frame (said information is equal to a number between 1 and $K^2$, and equal to 0 if the data part of said message slot is let free for newly arrived messages).

The procedure executed in a station until the status of a transmitted message is S is now described with reference to FIG. 4. When new messages NM, available at the output of a message generator 41, arrive at a station during a frame I−1, they have to wait for the following frame I (before the beginning of this frame I, they receive the downstream frame containing the feedback sent by the hub). A first test 42 is then carried out:

(a) if one or some slots are free (output Y), the station (step 43) chooses randomly one of them (D=number of said free slot), transmits the message in this slot, and transmits a request in one of the M minislots of said slot D, while keeping in memory a copy of the message and the minislot number d;

(b) if no slot is free for new arrivals (output N), the concerned station (step 44) keeps a copy of the message and transmits a reservation signal (=message transmission request) in one of the K×M minislots of the frame, while keeping in memory the number J of said minislot.

After the trip delay, the downstream frame corresponding to upstream frame I is received (step 45) by the station. A second test 46 is then carried out:

(a) if a message has been transmitted in slot D of upstream frame I (output N, corresponding to the situation "no collision"), the station looks at the feedback contained in slot D of the received downstream frame: if the status is S (successful transmission), the copy of the message is deleted (step 47);

(b) if the status of the data slot is C (collision, output Y) or no message has been transmitted (only a request), the station looks at the feedback contained in the slot corresponding to J (the number of the selected minislot during the step 43) and a third test 48 is carried out:

(i) if the identification of the winning slot is J, it means that this slot is reserved for this station in the upstream frame (I+R+1): the station will transmit its message in said reserved slot (step 49), without any request since it would be useless;

(ii) if the identification of the winning slot is not J, the station cannot transmit its message: it transmits a reservation signal (step 44) in one of the minislots of the reserved slots and keeps in memory the corresponding minislot number.

Figure 4:
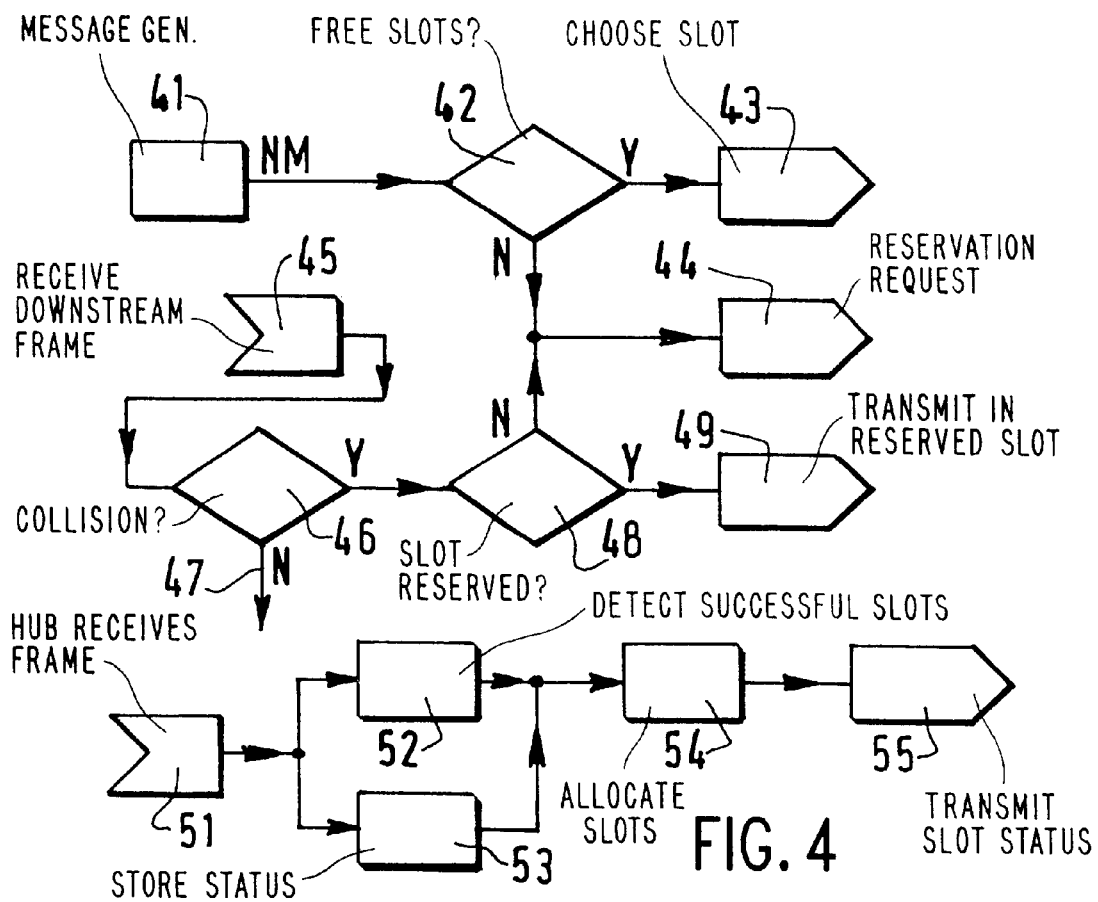
FIG. 4 illustrates in its upper part (references 41 to 49) the procedure executed in a station until the status of a transmitted message is S and in its lower part (references 51 to 55) the procedure in the hub.

In the hub, the procedure, also illustrated in FIG. 4, is the following. When the hub receives the frame I (step 51), it collects (detection step 52) all the minislots where successful requests have been transmitted and all the data slots with successful message transmission (the other data slots and minislots of frame I corresponding to detected collisions). Among these data slots, some of them have been sent as new arrivals in a free slot of the frame I, and the corresponding request for retransmission must be discarded from the number Jk of said minislots with successful requests. The resulting set of data slots is Sk. For the discarding step, it is needed that the hub keeps in memory the status of the slots in frame I (free for new arrivals, or reserved), and (R+1) frames status must therefore be memorized (step 53) by the hub in order to calculate Sk. The feedback formulation then takes place: the requested slots are allocated to respective reservations signals (step 54), each concerned slot being then reserved, and, as already seen, the hub puts two pieces of information in each slot of the downstream frame (the status E, S or C of the data slot, and the number Jk identifying the winning minislot, i.e. the number of the reservation signal corresponding to the allowed transmission in said data slot in the next upstream frame), said downstream frame broadcasting being the step 55 of the hub procedure.

The invention is obviously not limited to the previous implementation, from which other ones may be deduced without departing from the scope of the invention. For instance, the communication method according to the invention may have some jitter at high load. In order to reduce it, while the successful requests (i.e. those which will have a reserved slot in the next frame) are chosen by the hub among those which have not collided in the minislots of the current frame, the hub may take these requests into account more efficiently by putting them in a FIFO queue. The access delay is then composed now of three components:

(a) waiting for the next frame delay, i.e. the time period between the arrival of the message and the beginning of the frame in which the message is transmitted for the first time;

(b) contention delay, i.e. the time period between the beginning of the frame in which the message is transmitted for the first time and the complete reception of the frame in which a request is received successfully in the hub;

(c) waiting for transmission delay, i.e. the time period between the complete reception of the frame in which a request is received successfully in the hub and the first slot in which the message is transmitted.

The introduction of said transmission queue adds the waiting for transmission delay component but reduces the contention delay, which reduces noticeably the jitter because said contention delay is a multiple of the round trip time (=n×0,54 sec. in the above-indicated example), while the waiting for transmission delay can be less than one frame (i.e. a few slots). The jitter is reduced even at high loads since the majority of the packets are transmitted after a first successful transmission. They suffer a given jitter due to the queuing delay but which is much more smaller than the jitter caused by the retransmission of a request. Nevertheless the packets that suffer a collision in the data slot and in the minislot (which is quite rare) have to retransmit a request. In order to reduce the queuing delay for these old contentions and to avoid a competition with new arrived messages, a priority in the transmission queue may be given to them.

In all the cases, the proposed method is a very good candidate for instance for satellite channel protocols with a very large bursty population, especially for applications involving the generation of short constant length messages (interactive applications such as authentication, pay-per-view, data base consultations, but also all the applications that require the establishment of a connection within a short time).

What is claimed is:

1. A method of controlling the transmission of messages between a plurality of stations in a multiple access telecommunications network wherein said stations are interconnected via a main station over a communication channel having an upstream channel at least partially shared by said stations; the upstream channel being divided into successive frames of predetermined length, each frame consisting of K message slots each of which has a data part for transmission of a message generated by a station, and M minislots in which, in case of unsuccessful transmission of messages, retransmission requests can be transmitted in the form of available data slot reservation signals; wherein a reservation signal corresponding to a retransmission request can be transmitted by a station in any of the K×M minislots of the frame, not just a minislot of a message slot selected by such station for transmission of a message.

2. A method according to claim 1, wherein in case of collision between a reservation signal corresponding to a transmission request of a newly arrived message and a reservation signal corresponding to a retransmission request of a previous message, said retransmission request is allowed to be transmitted only in a minislot of a message slot which is already reserved for such retransmission.

3. A method according to claim 2, further comprising recycling of messages which have encountered collisions by giving them a higher priority over newly generated messages.

* * * * *